Aug. 12, 1930.   E. ALTENKIRCH   1,772,476
LIQUID SEAL BETWEEN SPACES IN WHICH DIFFERENT PRESSURES PREVAIL
Filed July 9, 1928
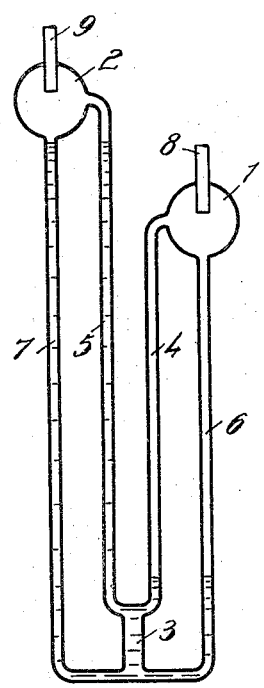
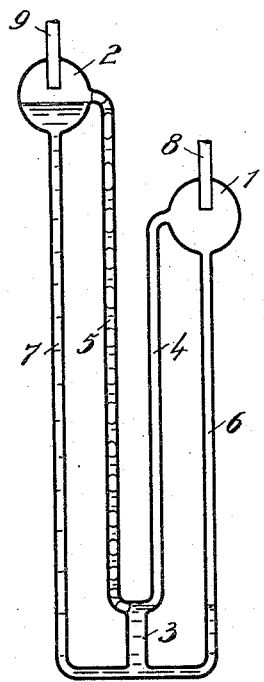
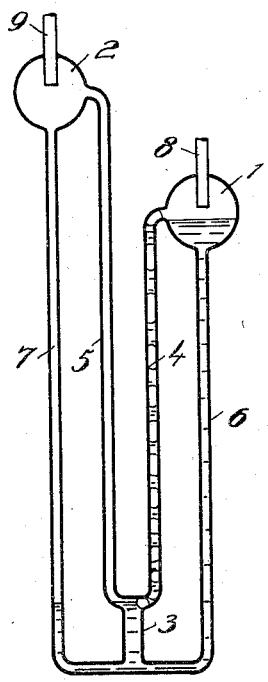
Inventor
Edmund Altenkirch
by Knight Bros.
attorneys Patented Aug. 12, 1930

1,772,476

UNITED STATES PATENT OFFICE

EDMUND ALTENKIRCH, OF ALT-LANDSBERG-SUD, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

LIQUID SEAL BETWEEN SPACES IN WHICH DIFFERENT PRESSURES PREVAIL

Application filed July 9, 1928, Serial No. 291,409, and in Germany July 19, 1927.

This invention relates to an improved sealing and pressure relief device adapted for use in fluid pressure systems having parts subjected to different fluid pressures.

A liquid seal as for example a U-tube partially filled with a liquid is a well known expedient for maintaining a substantially constant pressure difference between two parts of such a system. Where a seal of this nature also acts as a pressure relief device, gas must at times pass through the tube. Experience has shown that when this occurs part of the sealing liquid is often expelled from the tube and the device is rendered ineffective to properly perform its functions.

An object of the present invention is to provide a combined sealing and relief device in which this difficulty is overcome by the provision of means for maintaining a constant amount of sealing liquid therein.

A further object of the invention is to provide a liquid seal and pressure relief device of this nature which is reversible, that is, one in which an effective seal is maintained regardless of which side thereof is subjected to the higher pressure.

Other objects and advantages will appear hereinafter.

An embodiment of my invention is illustrated in the drawing affixed hereto and forming part of my specification.

In the drawing the Figs. 1 to 3 show the device in diagram in three different stages of operation.

Like parts are indicated by like numerals of reference throughout all the figures.

Referring to the drawing, 1 is the chamber or container in which the higher pressure prevails, 2 the chamber of lower pressure. The chambers 1 and 2 serve as reservoirs for sealing liquid used in the device as will appear hereinafter. The upper end of a pipe 3 communicates with a U-shaped pipe having the limbs 4 and 5, while the lower end is connected to another U-shaped pipe consisting of the limbs 6 and 7. The limbs 4 and 6 are connected to the chamber 1 and the limbs 5 and 7 to the chamber 2.

When the pressure in the chamber 1 rises above a predetermined amount, the level of the liquid in the limbs 4 and 6 drops until the gas has displaced the liquid in the limb 4 altogether and is able to pass into the limb 5. This condition is shown in Fig. 2. The pipes are made as small in diameter as possible not only to effect a saving in the amount of sealing liquid, which is usually mercury, but also to cause the circulation of the liquid upon the passage of gas into the limb 5. As the gas enters the limb 5 the weight of liquid in the branch 7 is greater than that in 5 and a circulation is produced by gravity. Upon the gas entering the chamber 2 it is separated from the liquid and passes out through the pipe 9. The liquid ejected from the pipe 5 drops back into the limb 7 and returns through the third pipe 3 into the limbs 4 and 5 and thus again stops the communication between them. If the excess pressure continues the particles of liquid are continuously moved upwards in the limb 5 and return through the pipe 7, as shown in Fig. 2. As shown in Fig. 3, when in excess pressure develops in the chamber 2, the direction of movement of the gas sealing liquid is reversed, the gas then passing into the chamber 1 and the sealing liquid circulating in the branches 4 and 6 instead of in the branches 5 and 7. By a suitable choice of the difference in elevation of the chambers 1 and 2, it is thus possible to cause the passage of the gas from one chamber into the other at a predetermined pressure difference.

While the above illustration discloses only the use of the device for sealing and relieving gas, the invention is not limited thereto, being equally well adapted for use with chambers filled with a liquid, the only difference being that then a heavier sealing liquid which does not mix with the liquid to be controlled, must be employed.

The above described device may be connected with parts of a fluid pressure system between which a definite pressure difference is to be maintained, by pipes 8 and 9, leading to the chambers 1 and 2. These connecting pipes may extend into the chambers 1 and 2 so far, that even when the system, serving as liquid seal, is turned upside down no sealing liquid is able to escape through these connecting pipes 8 and 9. In the example illustrated the chambers 1 and 2 have spherical shape, but it will be readily understood that they may have any other suitable shape. In any case the result will be that no sealing liquid is able to escape in whatever position the sealing device is installed.

Various modifications and changes may be made without departing from the spirit and the scope of the invention, and I desire, therefore, that only such limitations shall be placed thereon as are imposed by the prior art.

I claim as my invention:

1. In a liquid seal between two gas spaces of different pressure, in combination, a chamber in communication with the space of higher pressure, a chamber in communication with a space of lower pressure, a U-shaped pipe in communication with both said chambers, a second U-shaped pipe in communication with both said chambers, the limbs of one of said U-shaped pipes opening into said chambers at different points from the limbs of the other of said U-shaped pipes, a connecting pipe between the lowest points of both said pipes, a sealing liquid in all of said pipes, pipes connecting said chambers with said spaces of different pressure, and extending into said chambers to such an extent, that sealing liquid is unable to escape in any position of said pipe system.

2. A combined liquid sealing and pressure relief device including a pair of chambers adapted to be connected to parts of a fluid pressure system subjected to different fluid pressures, a pair of bent pipes having their upper ends connected to said reservoirs and their lower portions disposed at different levels, and means for interconnecting the lower portions of said pipes.

3. A combined liquid sealing and pressure relief device including a pair of U-shaped pipes adapted to be connected to parts of a fluid pressure system subjected to different fluid pressures, the limbs of said pipes being vertically disposed and the lower portions being horizontal and at different levels and a vertically disposed pipe interconnecting said lower horizontal portions of said U-shaped pipes.

4. A combined liquid sealing and pressure relief device including a pair of U-shaped pipes adapted to be connected to parts of a fluid pressure system subjected to different fluid pressures, the limbs of said pipes being vertically disposed and the lower portions being horizontal and at different levels and means for interconnecting said lower horizontal portions of said U-shaped pipes.

In testimony whereof I affix my signature.

EDMUND ALTENKIRCH.